J. M. WHITE.
PAN RIFFLE.
APPLICATION FILED SEPT. 1, 1908.
923,392.
Patented June 1, 1909.
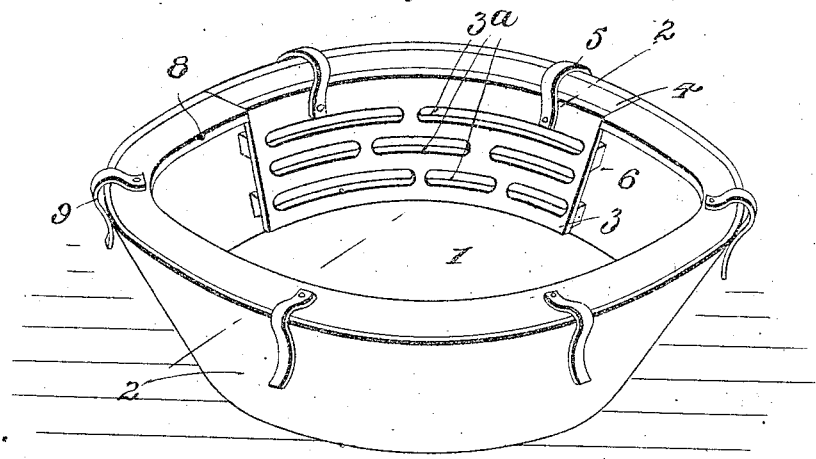
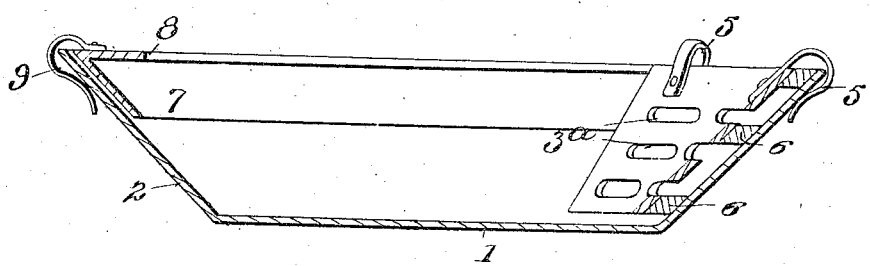
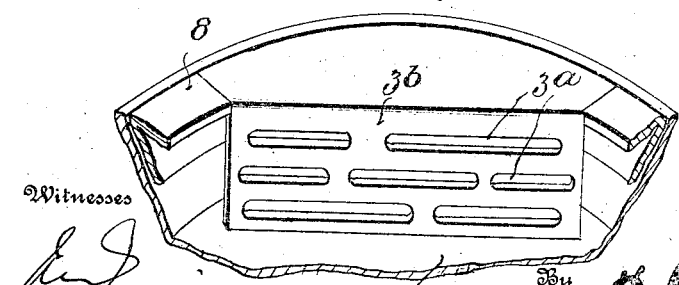
Inventor
J. M. White
Witnesses
By
R. Frank Loery, Attorneys

UNITED STATES PATENT OFFICE.

JOHN M. WHITE, OF SELMA, OREGON.

PAN-RIFFLE.

No. 923,392.   Specification of Letters Patent.   Patented June 1, 1909.

Application filed September 1, 1908. Serial No. 451,193.

*To all whom it may concern:*

Be it known that I, JOHN M. WHITE, citizen of the United States, residing at Selma, in the county of Josephine and State of Oregon, have invented certain new and useful Improvements in Pan-Riffles, of which the following is a specification.

This invention comprehends certain new and useful improvements in pan riffles, and the invention has for its object, a simple, and efficient construction of device of this character so arranged as to prevent the material from being inadvertently thrown out during the operation of separating the gold or other heavier material from the sand or lighter material by the gravity process.

With these and other objects in view, the invention consists in certain constructions, arrangements and combinations of the parts that I shall hereinafter fully describe and claim.

For a full understanding of the invention, reference is to be had to the following description and accompanying drawings in which:

Figure 1 is a perspective view of a riffle pan constructed in accordance with my invention; Fig. 2 is a transverse sectional view thereof, and, Fig. 3 is a sectional perspective view illustrating a differently shaped riffle.

Corresponding and like parts are referred to in the following description and indicated in all the views of the accompanying drawings by the same reference characters.

The pan itself to which my invention is applied may be of any desired construction or shape provided with a bottom 1 and sides 2 which are flared upwardly in the present instance.

3 designates the riffle which is formed with any desired number of openings $3^a$ which may be transversely elongated to any desired extent. This riffle is provided at its upper edge with a transverse support 4 extending the entire width of the riffle and snugly fitting against the inner side of the rim of the pan.

5 designates clips that may be secured to the riffle at each end thereof and that are designed to extend downwardly from the outer wall of the pan so as to securely hold the riffle in place within the pan with the lower edge of the riffle spaced from the bottom of the pan.

In the drawing 6 designates supports that are placed at intervals along the sides and bottom of the riffle so as to space the same from the inner wall of the pan at the side thereof where the riffle is located. In connection with the riffle 3, I preferably use a guard 7 which fits within the rim of the pan as shown and which is formed with an inwardly extending and overhanging flange 8 extending from one side of the riffle entirely around the rim of the pan to the opposite side of the riffle. This guard may be secured to the pan by spring clips 9.

In the practical use of my improved riffle pan, the pan is filled with the material to be washed and the pan is then placed in the water and by a rocking motion, the material and water is caused to pass out of the pan, and the heavy material obviously drops through the openings in the riffle and flows down into the corner of the pan where it is caught by the water and again carried through the riffle, thereby causing the cleaning or separating process to be a continuous one. The construction and arrangement of parts as herein described prevents the riffle from filling up or "baking" as often happens with riffles placed in the corner of a pan, while the guard 7 prevents the water or material from being slopped over or thrown out in the separating operation.

It is obvious that my invention is not limited to a curved riffle as illustrated in Figs. 1 and 2; for instance, the riffle itself may be straight as indicated at $3^b$ in Fig. 3, this form of riffle being advantageous for some uses.

Having thus described the invention, what is claimed as new is:

1. The combination with a pan of the character described, of a riffle provided with spacing supports, and spring clips secured to said riffle and extending outwardly and downwardly therefrom and designed to frictionally engage the rim of the pan, whereby to sustain the riffle within the pan.

2. The combination with a pan for the purpose specified, of a riffle secured within the pan, and a detachable guard secured within the pan at the rim thereof and extending inwardly from said rim, the guard being provided with outwardly and downwardly extending spring clips engaging the rim of the pan, whereby to detachably secure the guard to the pan.

In testimony whereof I affix my signature in presence of two witnesses.

JOHN M. WHITE. [L. S.]

Witnesses:
  VIOLA E. ANDERSON,
  R. C. CHURCHILL.